Dec. 12, 1950   P. GLASS ET AL   2,534,196
ELECTRICAL CONTROL CIRCUITS
Filed May 26, 1948   2 Sheets-Sheet 1

INVENTORS
PAUL GLASS
FRANK E. PREM

BY

ATTORNEYS

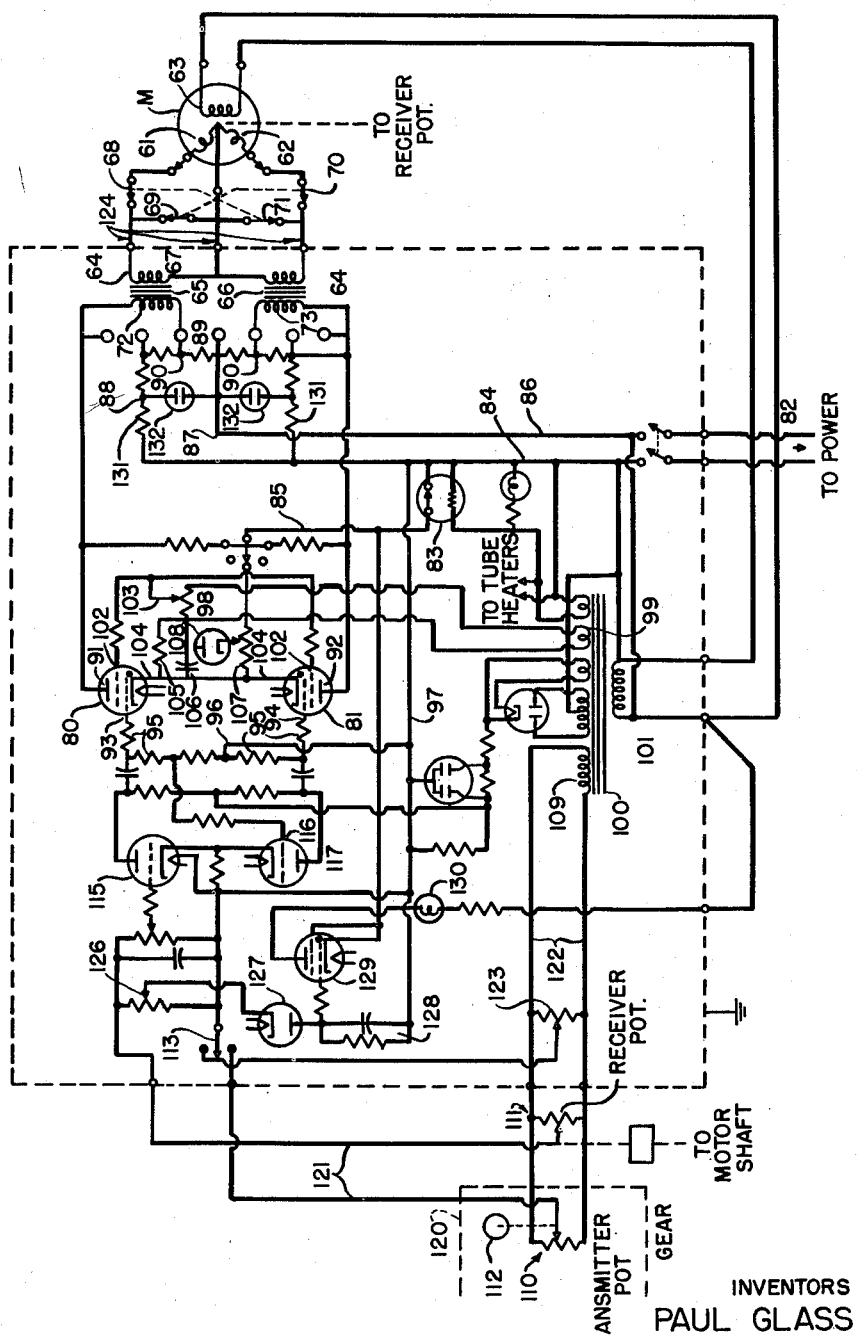

Patented Dec. 12, 1950

2,534,196

UNITED STATES PATENT OFFICE 2,534,196

ELECTRICAL CONTROL CIRCUITS

Paul Glass and Frank E. Prem, Chicago, Ill., assignors to Askania Regulator Company, Chicago, Ill., a corporation of Illinois Application May 26, 1948, Serial No. 29,304

4 Claims. (Cl. 315—270)

The present invention relates to a current pulse control system of the kind wherein a gaseous discharge tube is supplied by an alternating current source which applies alternate half cycles of positive voltage to the tube anode, the tube being so controlled as to remain non-conductive in the absence of a positive control voltage applied to its control grid during positive half cycles of anode voltage. The invention further relates to such a system wherein the total output current, and hence the power output of the tube, is proportional to the amplitude of the control grid voltage firing the tube, such proportionality being accomplished by so controlling the tube that its output comprises equal current pulses the total number of which per unit of time is proportional to the amplitude of the signal voltage.

Heretofore it has been proposed, as in United States Patents No. 2,386,677 and No. 2,417,868, both issued to Paul Glass, to operate a pulse control gaseous discharge tube supplied by an alternating current source by applying to the control grid of the tube a large suppressing bias voltage in such phase relation with the anode voltage as to prevent firing of the tube in the absence of a signal voltage, and to apply to the control grid a signal voltage for firing the tube. Such signal voltage may be an alternating voltage, displaced in phase from the suppressing voltage by a degree proportional to magnitude of the primary signal impulse, and combining with the suppressing voltage to produce a resultant grid voltage of a phase so related to the anode voltage as to permit the tube to fire. The signal voltage also may be a direct voltage of such magnitude as to overcome the suppressing voltage to permit the tube to fire during positive half cycles of the anode voltage. In the case of the alternating signal voltage the phase of the suppressing voltage on the control grid is so related to the phase of the firing characteristic in the absence of signal, as to hold the tube non-conductive, and a signal in effect shifts the phase of the grid voltage relative to the firing characteristic as to fire the tube, such relationships being shown in Figs. 2 and 1a of the respective noted patents. In the direct current signal form, shown in Fig. 1b of the later patent, the phase of suppressing voltage is fixed in relation to the anode voltage, and the direct current signal shifts the grid voltage curve vertically relative to the firing characteristic of the tube. By "firing characteristic" is meant the curve representing the amplitude of control grid voltage necessary to fire the tube, plotted against the anode voltage during the positive half cycle of the latter.

It also has been proposed, as in said Patent No. 2,386,677, to proportion the total output current of the pulse control tube to the magnitude of an applied signal by imposing on the control grid of the tube a direct current suppressing bias voltage, additional to the alternating suppressing bias, and proportional in magnitude to the number and frequency of conducting half cycles of the tube. This voltage drives the control grid voltage negative by increments corresponding to conductive half cycles until it is sufficient to overcome the signal voltage, blocking the tube for a period of time determined by a time constant of the circuit from which it is obtained. This auxiliary direct current biasing voltage in effect shifts the grid voltage vertically relative to the firing characteristic of the tube.

Because it is relatively simple to adjust the phase of the large alternating control grid suppressing voltage, and to adjust the phase of a primary source of signal voltage relative to that of the suppressing voltage so that shift of the latter can be used to control the tube, the phase of the resultant of the suppressing and signal voltage serves for accurate control of the pulse tube by shift of the signal voltage phase.

In certain situations, as where phase of supply line voltage varies, or stray fields are present, operation of a phase shift-controlled pulse system may be interfered with to the point of unsatisfactory control. Therefore, it has become desirable to provide a system that is actuated solely by presence or absence of a signal voltage applied to the control grid of the pulse tube. Additionally, it is desirable to so control the pulse tube that the frequency of its output pulses is proportional to the amplitude of the control grid signal voltage.

Such a system presents problems that are not solved by substituting a variable amplitude signal voltage for the variable phase signal voltage of prior systems. One such problem arises by reason of the fact that, since the tube must be sensitive to amplitude variations of the signal voltage, it is inherently impossible to use a signal voltage of predetermined uniform amplitude, as may be done in the phase shift system. Therefore, the instant potential of the control grid must be accurately controlled by the signal voltage. A suppressing bias voltage, effective to prevent firing of the tube under no-signal condition, must be applied to the tube, and the direct current pulse frequency control voltage must also be applied. Due to unavoidable variations in characteristics of circuit elements of the control grid and coupled signal amplifier output circuits and variable electrical effects that may disturb the conditions of such circuits, application of a suppressing voltage of the control grid will often exert unpredictable and erratic variations in the grid voltage. In addition, since relative amplitudes of the suppressing and signal voltages determines the firing or non-firing of the tube during any given positive anode voltage half cycle, the magnitude of the suppressing voltage must be accurately controlled.

These problems have been solved in the present pulse control circuit by employment of a gaseous discharge tetrode, isolating the signal voltage from the suppressing and frequency controlling bias voltages by applying the two latter to the shield grid of the tube and supplying the signal voltage source and the suppressing voltage source from, and in substantially fixed phase relation to the alternating current voltage supply of the anode circuit of the tube.

The primary object of the invention is to supply a pulse control system for a gaseous discharge tube having an alternating anode circuit supply wherein firing or nonfiring of the tube during any positive half cycle of anode voltage is determined by presence or absence of a signal voltage.

Another object is the provision of such a circuit wherein the frequency of groups of conduction half cycles of the tube is proportional to the magnitude of the signal voltage applied to the tube.

Another object is to provide a current pulse control circuit operable from an alternating current voltage source connected in series with the cathode-anode circuit of a gaseous discharge tetrode, wherein an alternating suppressing bias voltage is applied to the shield grid of the tube, and the control grid circuit is isolated from the suppressing voltage.

Still another object is to provide a pulse control circuit system by so combining the control grid circuit of a gaseous discharge tetrode with suppressing bias voltage and an anode voltage supply circuit, that in the absence of a control grid signal voltage the control grid is at cathode potential, and the suppressing voltage circuit prevents conduction of the tube.

An additional object is the provision of a pulse frequency control system comprising a combination of an alternating suppressing bias voltage circuit for maintaining the tube cut off in the absence of a control grid signal voltage and a pulse frequency control circuit arranged to add to the suppressing voltage a direct current suppressing bias voltage component proportional in magnitude to the frequency of conduction periods of the tube.

Another object of the invention is to provide a novel suppressing circuit connected across a cathode resistor and providing for rapid charge of a condenser included in the circuit during conduction periods of the cathode circuit and providing a slow leakage discharge.

An additional object of the invention is to provide in a signal circuit an auxiliary circuit arranged to give a signal when the magnitude of the signal voltage exceeds a predetermined level, and capable of use as a device for testing operation of the circuit.

Still another object is to provide a control system comprising signal, pulse control and output sections, with a novel combination of indicating circuits so arranged with the signal and output sections as to indicate nonfunctioning of the system and serving to a large extent to identify the inoperative section of the system responsible for such nonfunctioning.

In the accompanying drawings:

Fig. 4 is a wiring diagram of a motor position control system, illustrating typical uses and combinations of the circuits disclosed by Figs. 1, 2 and 3.

Figure 1:
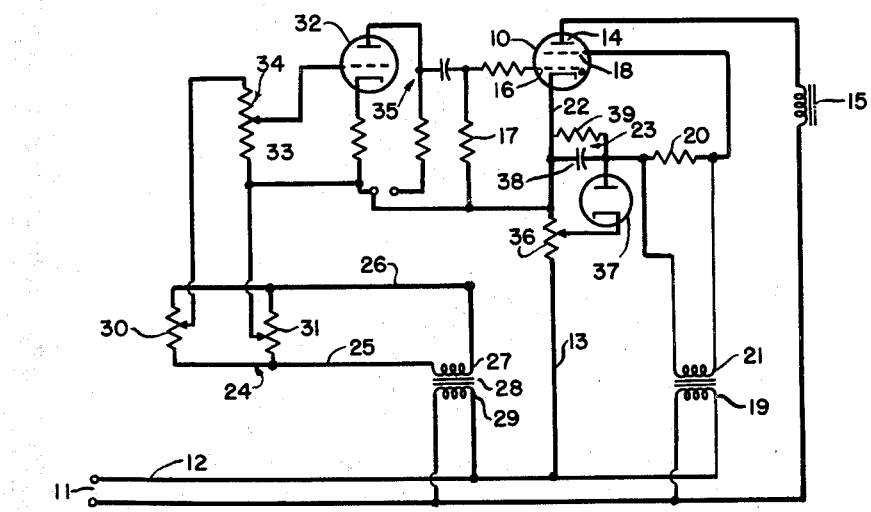
Fig. 1 is a wiring diagram of a pulse circuit, and a signal circuit for controlling it, arranged in accordance with the invention.

First referring to Fig. 1, a gaseous discharge tetrode is designated 10 and is supplied with power from an alternating current source 11, one side 12 of which is connected to the cathode lead 13 and the other to the anode 14 in series with a load 15. The control grid 16 of the tube is connected to the cathode side 12 of the source 11 through a resistor 17 and cathode lead 13.

A bias voltage is applied to the tube separately from the control grid to prevent conduction during positive half cycles of anode voltages under no-signal condition. This bias is in the form of an alternating voltage applied to the shield grid 18 of the tube substantially in phase opposition to the anode voltage. For this purpose a transformer primary 19 is connected across the voltage source 11, and a resistor 20 is connected across the secondary 21 of the transformer. The shield grid 18 is tied to the cathode 22 of the tube through resistor 20 and a resistor condenser network 23, a second purpose of which will be described later.

A signal bridge 24 comprises voltage lines 25 and 26 connected across the secondary 27 of a transformer 28, the primary 29 of which is connected across the source 11. The bridge includes a pair of potentiometers 30, 31, the resistances of which are connected in parallel across the lines 25, 26. The variable contacts of the potentiometers provide a null circuit output for the bridge, which is connected to the input of a voltage amplifier stage comprising a tube 32 to the grid and cathode of which is applied a voltage developed by current flow in the null circuit of the bridge through the resistance 33 of a potentiometer 34. The output of tube 32 is connected to the control grid 16 of the tetrode 10 by a resistance-condenser coupling 35 in the plate circuit of tube 32.

The operation of the circuit described above is as follows: In the condition where no signal is applied to the input of amplifier tube 32 when the network of potentiometers 30 and 31 is balanced, no signal is applied to the control grid 16 of the tube 10. Since alternating voltage is applied across the anode 14 and cathode 22 of tube 10, conduction on each positive half cycle of anode voltage, which ordinarily would occur, is prevented by the suppressing bias that is applied to the shield grid 18 of the tube by the transformer 21 and resistor 20 in phase opposition to the anode voltage. When the network 30, 31 is unbalanced in a direction to apply a signal to the control grid 16, such signal is applied to the input of tube 32 substantially in phase opposition to the anode voltage applied to the anode 14 of tube 10. Inversion of this signal by the tube 32 results in the application to the control grid 16 of a positive signal voltage substantially in phase with the anode voltage and serving to overcome the bias voltage applied to shield grid 18, permitting the tube to conduct during positive half cycles of anode voltage.

In order to proportion the total output current of the tube 10 to the magnitude of a tube-firing signal produced by the bridge, the number of half cycles during which the tube conducts is determined by the amplitude of a positive signal applied to the control grid of the tube 10. To this end the resistor condenser network 23 is connected across the cathode resistor 36 of the tube 10 by a rectifier 37 arranged rapidly to charge the condenser 38 when the tube 10 is conducting. The resistor 39 connected across the condenser provides a leakage path for relatively slow discharge of the condenser. The suppressing bias resistor 20 is connected to the common end of condenser 38 and resistor 39, that is to say, to the side of the condenser that becomes negative when the condenser is charged by tube conduction. The condenser resistor network superposes on the alternating bias voltage developed across resistor 20 and applied to the shield grid 18 a direct current voltage component. Due to the application the condenser during each half cycle of conduction by the tube, of a relatively large voltage developed across the cathode resistance 36, and relatively slow discharge of the condenser through resistance 39, the condenser 38 is charged during a conducting half cycle to a level sufficient to block the tube during one or more succeeding half-cycles of positive anode voltage. The number of such blocked half cycles depends on the discharge rate of the condenser and the amplitude of the signal voltage. The charge level and the discharge rate respectively depend on the values of the resistances 36 and 39. These values are so selected that the number of conducting half cycles per time unit is proportional to the amplitude of the signal voltage. After charging to block the tube, the condenser 38 discharges until the applied signal voltage can again fire the tube. Therefore, the number of conducting half cycles per unit of time, and consequently the total current output of the tube, depends on and is proportional to the amplitude of the signal voltage. Depending on the discharge rate of the condenser, the tube may be maintained blocked at a given signal amplitude during one or more half cycles of positive anode voltage. Increase of signal amplitude while the tube is blocked results in firing of the tube at a greater magnitude of the direct current component of the shield grid suppressing voltage.

Figure 2:
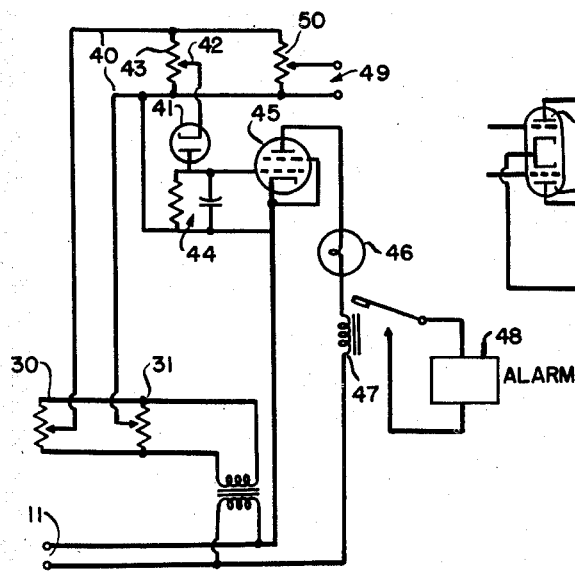
Fig. 2 is a wiring diagram of a specialized signal circuit provided with an auxiliary circuit that may be used as a test circuit for operativeness of the amplifier and pulse circuits, or as a warning signal for indicating the presence of a signal voltage above a predetermined maximum.

Fig. 2 discloses an indicating circuit that may advantageously be used in the input of the circuit of Fig. 1, but it also may be used in any signal circuit, or circuit wherein a potential exists across a pair of lines. As indicated it is useful in a signal circuit and is here shown in connection with an alternating current circuit, energized by an alternating current source 11. The purpose of this circuit is to provide a visual or audible indication, either for indicating that the circuit to which the signal is applied is not functioning properly or to test the operativeness of the signal circuit. The indicating circuit is connected as an auxiliary circuit across circuit lines 40 of the circuit that it monitors, here shown as comprising the null circuit of an alternating current potentiometer bridge 30, 31.

The indicating circuit comprises a rectifier 41, shown as a diode. To permit selection of the voltage across the lines 40 at which the signal circuit operates, the cathode of the rectifier 41 is connected to the variable contact 42 of a potentiometer 43 connected across the lines 40 to act as a voltage divider.

The anode of the rectifier 41 is connected to the input end of a filtering resistor and condenser network 44, the opposite end of which is connected to one of the lines 40. The rectifier 41 and filter network 44 connected across the circuit lines 40 serve to produce at the anode of the rectifier a negative voltage the magnitude of which is proportional to the amplitude of the alternating voltage across the circuit lines 40. This voltage is used to control a relay tube 45, preferably a gaseous discharge tube, to the control grid of which the filtered voltage is applied. Normally tube 45 conducts on positive half cycles of anode voltage, applied from any convenient source such as 11, but when the voltage of circuit 40 has increased beyond the predetermined maximum selected by the position of the potentiometer contact 42, the control grid of tube 45 is driven sufficiently negative to prevent conduction. The rectifier and filter network provide this action and control of the tube 45 regardless of the polarity of the alternating voltage of the circuit 40 at any given instant.

The anode of tube 45 may be series connected with one or more visual or audible indicating devices, such as a lamp 46 and/or the actuating coil 47 of a relay that controls a buzzer 48. The circuit may be used for testing the operability of the amplifier or other circuit used with or controlled by a circuit such as 40, for example as will appear from the description of Fig. 4, or it may be used to test the circuit itself. In the latter case the signal circuit may be disconnected from the circuit that it drives. In Fig. 2 the input stage of such a circuit is designated 49 and it is connected to the circuit 40 by a potentiometer 50. For testing the bridge circuit, the potentiometer 50 may be turned to a zero position, and thereafter relative adjustments of the potentiometer 30, 31 will actuate the auxiliary circuit to indicate the presence or absence of a voltage across the lines 40.

Figure 3:
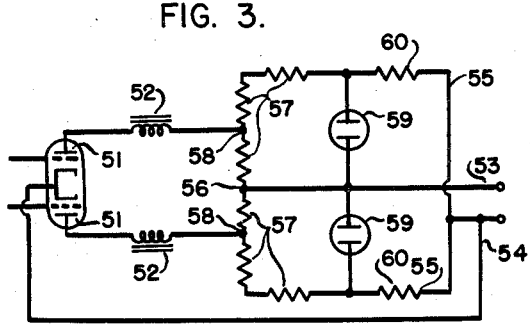
Fig. 3 is a wiring diagram of an indicator circuit for use in a control system having parallel, selectively operable output circuits, for indicating operation of either output and identifying the operating output.

Fig. 3 discloses a signal circuit for the output of a control circuit of the type wherein one or the other of a pair of output tubes is selectively actuated to permit choice of operation between two output circuits. In this circuit the anodes of the respective output tubes are designated 51, the anode of each being connected through a load 52 with one side 53 of an alternating current source, the other side 54 of which is connected to the cathodes of the tubes. Between the load and the voltage source is inserted a system of parallel voltage divider resistance networks, each having an end 55 connected to the cathode side 54 of the power source and a common point 56 connected to the opposite side 53 of such source. Between such points of the network are connected parallel series of resistances 57. The loads are connected to points in the voltage dividers adjacent the side 53 of the source, in series with relatively high end portions 58 of the resistance series 57. Glow lamps 59 are connected between the side 53 of the current source and points of the respective resistance series adjacent the ends 55 and the side 56 of the power source, being connected to the latter through relatively high resistance portions 60 at the ends of the series 57.

The resistor networks are so balanced that when neither of tubes 51 is conducting the voltages across the glow lamps is insufficient to fire them during either half cycle of anode voltage. However, upon conduction of either tube, the increased current flowing from the load to the side 53 of the current source through the resistance portions 58, increases the voltage drop across one of the lamps 59, and that lamp fires giving visual indication that one output circuit is operating and identifying the output circuit that is so operating.

Fig. 4 is a general circuit diagram wherein each of the circuits disclosed individually in Figs. 1 to 3 is combined. The pulse circuit of Fig. 1 is duplicated to provide a pair of selectively conductive gaseous discharge tubes having output circuits similar to that shown in Fig. 3 and the circuit is illustrated as being used for positioning control of an electric motor.

The motor M is herein shown as a shaded pole motor, having shading coils 61 and 62, energization of which, due to transformer coupling with the field coil 63, respectively causes the motor to rotate in one direction or the other. These shading coils connect in series respectively with two high impedance secondaries 64 of saturable transformers 65 and 66, the primaries of which are selectively energized to saturate the associated secondary and permit flow of shading coil current, by parallel outputs of the pulse control section to be described below. A common return circuit line 67 is connected between the common ends of the shading coils 61 and 62 and a common point between the secondaries 64. Manual control switches 68 and 69 are respectively connected between the shading coil 61 and secondary of transformer 65 and across such secondary and similar switches 70 and 71 are connected in the circuit of the shading coil 62. Switches 68 and 71 are ganged together for simultaneous operation, as are switches 69 and 70. Closing of either set of switches 68, 71 or 69, 70 permits current to circulate through the shading coil 61 or 62 due to transformer coupling between such coil and the field coil of the motor, so that closing of either gang of switches permits the motor to run in the direction resulting from energization of the shading coil in that circuit.

The pulse control section of the system, by means of which one or the other of the primaries 72 or 73 of the transformers 65 and 66 is saturated to permit operation of the motor in a selected direction comprises a pair of gaseous tetrodes 80 and 81. The tetrodes are supplied with power from an alternating current source 82, through a thermal time delay switch 83 connected between one side 84 of the alternating current source and the cathode lead 85 of the two tubes. The other side 86 of the current source is connected to a center point 87 of the voltage divider network 88 similar to that shown in Fig. 3, and having opposite end points 89 and intermediate taps 90. These intermediate taps 90 are connected in series with the primaries 72 and 73 of saturable transformers 65 and 66, which correspond to the loads 53 of Fig. 3, and with the anodes 91 and 92 of the tubes 80 and 81. The control grids 93 and 94 of the tubes 80 and 81 are connected through resistors 95 and lines 96 and 97 of the same side 84 of the alternating current source as the cathode circuit thereby being tied to the cathode side of the voltage source.

In order to make conduction of the tubes 80, 81 responsive to the presence of a control grid signal voltage in phase agreement with the anode voltage applied in the same phase to the anode of each to suppress firing of both tubes during periods when no signal is applied to the control grid of either, and to proportion frequency of conduction half cycles to the amplitude of such a control grid signal voltage, a suppressing and pulse frequency control circuit similar to that of Fig. 1 is used. Such circuit applies to the shield grid of each tube an alternating suppressing voltage in phase opposition to the anode voltage, and at each conductive half cycle applies a direct current voltage component that decreases as a function of time.

The alternating suppressing bias voltage is applied by a potentiometer resistance 98 that is connected across a secondary 99 of a transformer 100 having its primary 101 connected across the voltage source 82, so that a voltage in substantial phase opposition to the anode voltage of the tubes 80, 81 is produced across the resistance. This voltage is applied to the shield grids 102 of both tubes by the variable contact 103 of the potentiometer, the end of the resistance of which is tied to the cathodes 104 of the tubes by the resistance 105 and condenser 106 network. This network is connected across the cathode resistance 107 in series with the rectifier 108, for operation as described in connection with Fig. 1, the condenser 106 charging during a conductive half cycle to block conduction of both tubes, and to maintain the tubes blocked for a period determined by the time constant of the network and amplitude of the signal voltage.

In order to energize one or the other tube, a signal circuit and an amplifying circuit are so arranged that the signal circuit will impose on the input of the amplifying circuit a signal voltage that will be substantially in phase or in substantial phase opposition to the voltage applied to the anodes 91 and 92 of the pulse control circuit tubes 80 and 81. This signal is applied to an amplifying and inverting stage, the inverted signal being reduced and applied to a second amplifier having its output connected to the control grid 94 of the tube 81, while the amplified signal from the first stage is applied to the control grid 93 of the tube 80. By this arrangement the signal applied to the respective control grids 93 and 94 are in phase opposition to each other, one being substantially in phase with the voltage applied to the anodes of the tubes 80 and 81, while the signal voltage applied to the other control grid will be in substantial phase opposition to such anode voltage. The signal applied to the control grids is so amplified by the amplifier and inverting stages as to be proportional to the magnitude of the signal applied to the input of the first stage. The control grids being tied to the cathode side of the line, and isolated from all circuits except the outputs of the amplifier circuit are effectively isolated from disturbing voltages.

The system is particularly useful in motor control. Due to the characteristics of the gas filled tubes, each conducting half cycle produces a current pulse of a fixed magnitude so that the resulting current pulse applied to the shading coil produces a torque of a single magnitude. While the speed of the motor is not directly proportional to the magnitude of the signal, the higher frequency of groups of conducting pulses at large signal tends to run the motor at maximum speed during application of a large signal, while decreasing frequency of the current pulses during application of a diminishing signal reduces the speed of the motor so that the motor automatically slows as it approaches the required position and over-shooting and hunting are prevented.

The signal circuit comprises an alternating current bridge energized by a secondary 109 of the transformer 100 across which are connected resistors of potentiometers 110 and 111, which respectively constitute a transmitter or operating signal impulse generator and a feedback signal impulse generator. The transmitter potentiometer is variable by a control 112 which may be manually actuated or operable in response to variation in a condition that is controlled by operation of the motor M. The feedback potentiometer is variable by operation of the motor shaft, with the system being so arranged that the motor is operated in a direction to operate the latter potentiometer to balance the bridge when there exists disagreement between the potential levels of the variable contacts of the two potentiometers. Since the bridge circuit is energized through the transformer 100 from the alternating current source 82, the signal voltage existing between the variable contacts of the two potentiometers will be either in phase or in phase opposition to the voltage of the power source, depending upon which potentiometer contact is at the higher potential. The signal is applied to the input of the voltage amplifier circuit through a single-pole, double-throw switch 113. This signal is applied to the control grid of an amplifying stage tube 115. The output of this tube is divided, part being applied to the control grid 93 of the pulse control tube 80 and the other to the grid 116 of an inverting and amplifying tube 117, the output of which is connected to the control grid 94 of the pulse control tube 81. As indicated above, the output voltages of the tubes 115 and 117 respectively are in phase and in phase opposition, depending on the phase of the signal bridge output, with the anode voltages applied to the control tubes 80 and 81 as well as the suppressing voltage applied to the grids 102 from the transformer secondary 99.

The arrangement is such that upon unbalancing of the signal bridge circuit, as for example by varying the position of the movable contact of the signal potentiometer 111, signal voltages in 180° opposition to each other are applied to the control grids of the tubes 80 and 81. The signal voltage applied to the grid of one of these tubes reinforces the suppressing voltage applied to the shield grids by the transformer 89 through the potentiometer 103, while the signal voltage applied to the other grid opposes that suppressing voltage. The gain of the amplifier stages 115 and 117 is so adjusted that the amplitude of the signal voltages applied to the grid 93 or 94 is sufficient to fire that tube to which the signal voltage is applied in phase agreement with the anode voltages. As explained before, the frequency of groups of conduction half cycles is made proportional to the magnitude of the control bridge signal by the auxiliary suppressing voltage circuit connected to the cathode circuit of the pulse tubes.

The variable contact of the feedback potentiometer 111 is mechanically connected to the output shaft of the motor M in such arrangement that the signal voltage produced by the bridge as a result of unbalancing the circuit is reduced in proportion to the consequent operation of the motor, so that when the degree of such motor operation corresponds to the degree of unbalance of the bridge circuit, the latter circuit will again be balanced, eliminating the signal voltage and permitting the pulse control section comprising the tubes 80 and 81 to come to its normal inoperative or no-signal state with the control grid suppressing voltages preventing firing of the tubes.

The physical arrangement of the circuit may be that indicated by the dotted lines. The dotted rectangle designated 120 may comprise a control station located at a point remote from the amplifier and pulse control stages and the latter stages in turn may be located remote from the motor. To this end the signal circuit lines 121 comprising the means for applying the signal to input leads to the amplifier stage and the voltage lines 122 of the bridge circuit may be contained in a cable extending between a control station and an amplifier circuit station. An additional control may be provided at the amplifier station by means of a third bridge potentiometer 123, the variable contact of which is connected with one of the contacts of the switch 113, permitting either potentiometer 111 or 123 to connect to the input of the amplifier stage.

The motor M, as indicated, may be located remote from the amplifier and control station by extending the lines that connect the secondaries of the output transformers 65 and 66 with the shading coil circuits and the switches 68, 69, 70, and 71 may be located either adjacent the motor or at the amplifier station for manual control of the motor.

The motor controlled potentiometer 111 may be located at the motor station and the bridge lines extended between the motor and transmitter, to avoid a long mechanical connection extending from the motor to the control station.

The system herein disclosed presents advantages of an alternating current system, operable to control the occurrence or nonoccurrence of output current pulses during alternate half cycles of the supply voltage in accordance with the presence or absence of a signal voltage, and with the magnitude of such voltage. As disclosed by Fig. 4, the system is highly useful for remote position control of a motor. It has peculiar advantages in that the control of output current pulses is extremely sensitive to signal voltages, but is very stable and unaffected by irregularities of commercial supply voltage and stray fields.

As indicated above, the circuits of Figs. 2 and 3 may be combined with the circuit of Fig. 1. The combination of both such circuits produces certain advantages, due to their cooperative effect, as will appear below.

A circuit similar to that of Fig. 2 is shown in Fig. 4, connected as a null balance circuit for the signal circuit. The null balance circuit is controlled by a potentiometer 124 connected across the signal circuit lines 121 and the variable contact 126 of which is connected in series with the cathode of a rectifier 127. The output of the rectifier 127 is filtered by the network 128 and applied to the control grid of a gaseous discharge relay tube 129, the anode of which is supplied with alternating current voltage from source 82 in series with a signal device 130. Normally the tube 129 conducts on alternate half cycles of anode voltage, but when the potential across the lines exceeds a certain maximum, which may be selected by adjustment of potentiometer contact 126, the tube is blocked, and the consequent deenergization of the device 130 indicates the excessive voltage across the signal circuit lines 121.

The circuit of Fig. 3 may also be combined with the circuit of Fig. 1, and is so shown in Fig. 4.

Connected in series with the primaries 72, 73 of the saturable transformers 65, 66, and the voltage supply lines 84, 86 are voltage dividing resistance series 131. Glow lamp indicators 132 are connected between one line 86 of the voltage supply and such points of the network 131 as to impose across them voltages that are insufficient to fire them during nonconduction of the respective tubes, but that are increased by the current flow during conduction to a level above the firing potential. Thus, firing of one glow lamp or the other gives a visual indication that one tube is conducting, and the identity of the firing lamp indicates which tube is the one that is conducting.

Contacts 133 are auxiliary connecting means provided for connecting into the control circuit a motor having control current requirements other than those of the motor M. These auxiliary contacts 133 are connected into the resistance series 131 at such points as to provide proper voltages across the glow lamps 132 to operate them in the described manner.

As mentioned above, the combination of both the circuits of Figs. 2 and 3, with a control circuit, such as that of Fig. 1, is highly advantageous, since such combination produces indicating results not obtainable by either alone. As described above, actuation of the null balance circuit of Fig. 2 indicates excessive signal voltage. This may be caused either by a fault of the signal bridge circuit, or by failure of the motor to operate, due either to motor failure or nonfunctioning of the amplifier or pulse control sections. Failure of the amplifier or pulse section will be indicated by lack of motor operation accompanied by lack of indication by the glow lamp and indication by the null balance circuit. Motor failure will be indicated by null circuit indication, firing of a glow lamp and lack of motor operation. Failure of the signal circuit will be indicated by lack of glow lamp and null balance circuit indications. It will be seen, therefore, that by comparison of the indication provided by the two circuits of Figs 2 and 3 with each other, and with motor operation, the identity of a nonfunctioning section of the system may be largely determined.

Again referring to the pulse circuit of Fig. 1, and to the pulse control section of Fig. 4, it is to be understood that, although the control of the pulses is herein disclosed as comprising a blocking charge applied to the condenser during a single conductive half cycle of the fired tube, and output current control is accomplished by determination of the number of ensuing nonfiring half cycles, the constants of the condenser charging and discharging networks may be such that more than one conductive half cycle may be required to charge the condenser to blocking level. The disclosed type of operation is regarded as preferable, but as indicated it is not essential.

We claim:

1. A pulse control circuit comprising a gaseous discharge tetrode having an anode circuit for connection in series with a load and an alternating current source and including a cathode resistor, means for applying to the shield grid of the tetrode an alternating suppressing bias voltage in substantial phase opposition to the anode voltage, means for applying to the control grid a signal voltage for overcoming such bias voltage to permit the tube to conduct during positive half cycles of anodes voltage, and a means including a condenser connected across the cathode resistor and a circuit for applying to the shield grid in addition to the alternating suppressing voltage the negative direct current voltage developed across the condenser during the connection as a suppressing bias voltage proportional in amplitude to the number of successive conducting half cycles of the tetrode.

2. A pulse control circuit comprising a gaseous discharge tetrode having an anode circuit for connection in series with a load and an alternating current source and including a cathode resistor, means for applying to the shield grid of the tetrode an alternating suppressing bias voltage in substantial phase opposition to the anode voltage, means for applying to the control grid a signal voltage for overcoming such bias voltage to permit the tube to conduct during positive half cycles of anode voltage, a condenser connected across said cathode resistor by a circuit arranged to charge the condenser rapidly during conducting half cycles of the tube and providing a leakage path for slow discharge of the condenser, and means for applying the negative condenser voltage to the shield grid in addition to the alternating suppressing voltage.

3. A pulse control circuit comprising a gaseous discharge tetrode having an anode circuit for connection in series with a load and an alternating current source and including a cathode resistor, means for applying to the shield grid of the tetrode an alternating suppressing bias voltage in substantial phase opposition to the anode voltage, means for applying to the control grid a signal voltage for overcoming such bias voltage to permit the tube to conduct during positive half cycles of anode voltage, a rectifier and a condenser connected in series across the cathode resistor, a leakage resistance connected across the condenser, and circuit means connecting the shield grid and the side of the condenser negatively charged during conduction of the tetrode.

4. A pulse control circuit comprising a gaseous discharge tetrode having an anode circuit for connection in series with a load and an alternating current source and including a cathode resistor, a rectifier and a condenser connected in series across said cathode resistor to permit rapid charging of the condenser during conducting half cycles of the tube, means providing a leakage discharge path for said condenser, a resistance connected between the shield grid and the side of the condenser that charges negative, and a biasing transformer having its primary connected across said alternating voltage source and its secondary connected across said resistance for applying to the shield grid an alternating suppressing bias voltage in substantial phase opposition to the anode voltage.

PAUL GLASS.
FRANK E. PREM.

REFERENCES CITED

The following references are of record in the file of this patent:

UNITED STATES PATENTS

| Number | Name | Date |
|---|---|---|
| 2,020,275 | Beers | Nov. 5, 1935 |
| 2,047,760 | Winograd | July 14, 1936 |
| 2,084,159 | Mittag | June 15, 1937 |
| 2,084,899 | Edwards | June 22, 1937 |
| 2,122,271 | Alexanderson | June 28, 1938 |
| 2,305,845 | Cockerell | Dec. 22, 1942 |
| 2,369,678 | McWhirter et al. | Feb. 20, 1945 |
| 2,431,705 | Nemet | Dec. 2, 1947 |
| 2,435,965 | Hartig | Feb. 17, 1948 |